United States Patent [19]

Moretto

[11] 4,142,703
[45] Mar. 6, 1979

[54] BRACKET ASSEMBLY

[76] Inventor: Jose P. Moretto, 284 W. First Ave., El Paso, Ill. 61738

[21] Appl. No.: 864,533

[22] Filed: Dec. 27, 1977

[51] Int. Cl.² ............................................. F16M 13/00
[52] U.S. Cl. .................................. 248/214; 248/226.3; 248/230; 403/400
[58] Field of Search .............. 248/72, 214, 215, 226.1, 248/226.3, 230, 340, 341

[56] References Cited

U.S. PATENT DOCUMENTS

| 977,704 | 12/1910 | Brownlee | 403/400 X |
|---|---|---|---|
| 1,025,519 | 5/1912 | Dormandy | 248/230 |
| 1,219,354 | 3/1917 | Seward | 248/214 |
| 1,579,136 | 3/1926 | Paxon | 248/228 X |
| 2,558,323 | 6/1951 | Strun | 248/226.1 X |
| 2,689,102 | 9/1954 | Whalen | 248/230 |

FOREIGN PATENT DOCUMENTS

| 3471 of | 1915 | United Kingdom | 248/230 |
|---|---|---|---|
| 500060 | 2/1939 | United Kingdom | 248/230 |

Primary Examiner—William H. Schultz
Attorney, Agent, or Firm—Thomas R. Vigil

[57] ABSTRACT

The bracket assembly includes a U-shaped plate member having a flat bight portion and flat upstanding first and second leg portions, the outer end of at least one of the leg portions being concave. The assembly further includes a C-shaped plate member a bolt and a nut. The C-shaped member has a flat bottom portion, a flat intermediate portion extending upwardly from one edge of the bottom portion and a curved top portion. The bight portion and the bottom portion each have openings therein for receiving the bolt when the bottom portion is seated on the bight portion and a tubular frame member is received between the curved portion and the concave end. In one embodiment both leg portions have concave ends and in another embodiment the bight portion is longer than either of the leg portions and only one leg portion has a concave end. The second embodiment of the bracket assembly is adapted to engage a cross arrangement of two tubular frame members with one tubular member being received within the U and adjacent the first leg portion with the second tubular member crossing the first tubular member extending under the curved portion on one side thereof and against the first tubular member and the concave end on the other side. A lamp assembly can be secured by the nut and bolt against the bottom side of the bight portion.

9 Claims, 5 Drawing Figures

BRACKET ASSEMBLY

BACKGROUND OF THE INVENTION

1. Field of the Invention

The present invention relates to a bracket assembly adapted to be fastened to a tubular frame member of a framework. More specifically, the bracket assembly is fastened to one or two tubular frame members in a framework utulized in a theatre and is adapted to mount a lamp assembly to the framework.

2. Description of the Prior Art

Heretofore various bracket assemblies have been proposed for securement to a tubular frame member. Additionally, various bracket assemblies have been proposed for securing a cross or T arrangement of two tubular members together. Additionally, various bracket assemblies have been proposed, not only for securement to a tubular frame member, but also for securing to the bracket another device. Examples of such previously proposed brackets and bracket assemblies are disclosed in the following United States patents:

U.S. Pat. No. 575,857 595,196 655,951 3,126,100 3,167,874

As will be described in greater detail hereinafter the bracket assembly of the present invention differs from the previously proposed brackets and bracket assemblies by being of simple and inexpensive construction and configuration and includes two members which are formed from bar stock respectively into a U-shaped member and a C-shaped member. The ends of the U-shaped member are concave for engaging one side of a tubular frame member and the C-shaped member has a curved end which engages the other side of a tubular frame member. The bottom portion of the C and the bight portion of the U-shaped member each have an opening through which a bolt can extend for drawing the C-shaped member toward the U-shaped member thereby to hold a tubular frame member therebetween. Also, with this arrangement a lamp assembly can be fastened against the flat bottom of the U-shaped member by a nut threaded on the bolt.

SUMMARY OF THE INVENTION

According to the invention there is provided a bracket assembly adapted to be fastened to at least one rod shaped frame member of a framework, said bracket assembly comprising a U-shaped plate member having a flat bight portion with an opening therethrough and first and second leg portions, at least said first leg portion being concave at the outer end thereof, a generally C-shaped plate member having a flat bottom portion, a flat upright intermediate portion extending from one edge of said bottom portion and a curved portion extending from said intermediate portion, said bottom portion having an opening therethrough adapted to be aligned with said opening in said bight portion and means received through said openings for fastening said members together, to the at least one rod member, and, if desired, to a lamp assembly.

DESCRIPTION OF THE PREFERRED EMBODIMENTS

Figure 1:
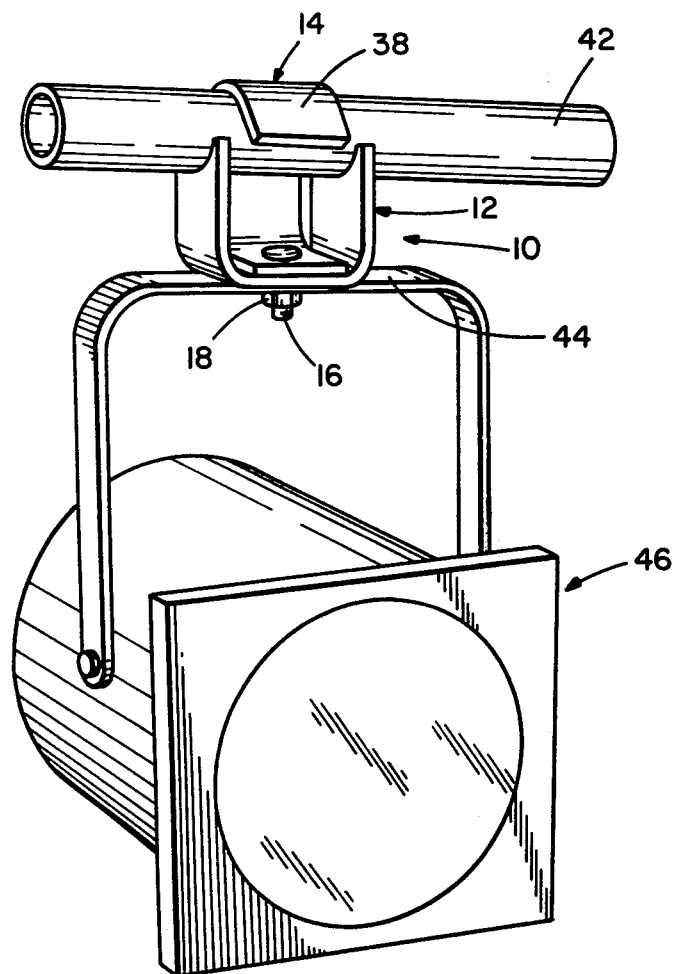
FIG. 1 is a perspective view of one embodiment of the bracket assembly of the present invention secured to a tubular frame member for mounting a lamp assembly to the frame member.

Referring now to the drawings in greater detail there is illustrated in FIG. 1 one embodiment of the bracket assembly of the present invention which is generally identified therein by reference numeral 10. The bracket assembly 10 includes a generally U-shaped member 12 and a generally C-shaped member 14 as well as a bolt 16 and a nut 18.

Figure 2:
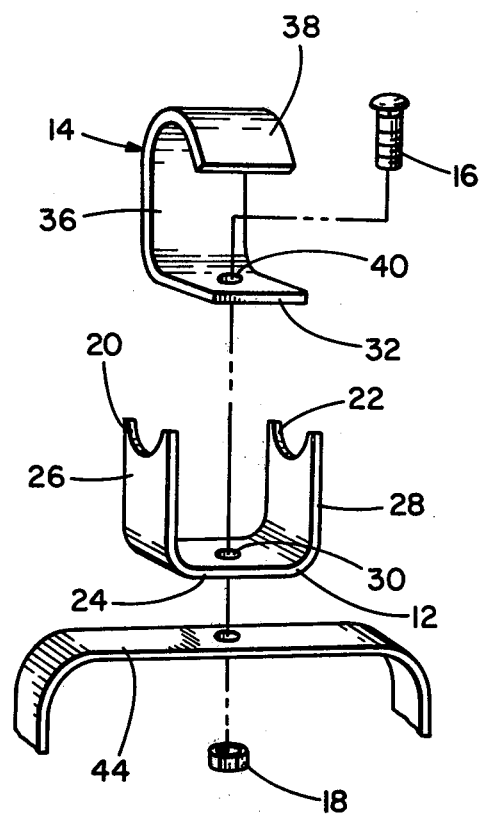
FIG. 2 is an exploded perspective view of the bracket assembly shown in FIG. 1.

As apparent from FIGS. 1 and 2 the U-shaped member 12 is made from a strip of plate metal or bar stock which can be of any desired width, i.e., 1½" to 2" in width. The bar stock or plate metal is formed at each end thereof with concave end formations 20 and 22 and the bar stock is bent or formed into the shape of a U so as to have a flat bight portion 24 and two upstanding leg portions 26 and 28 each of which have one of the concave outer ends 20 and 22. Also, an opening 30 is formed in the bight portion 24 midway between leg portions 26 and 28.

Figure 5:
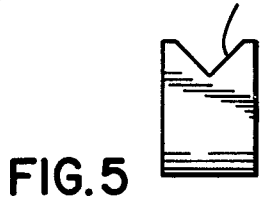
FIG. 5 is a vertical end view of a modified outer end of the leg portion of either of the U-shaped members shown in FIGS. 1 and 2 or FIGS. 3 and 4.

In the embodiment shown in FIGS. 1 and 2 the concave ends 20 and 22 are generally semi-circular. As shown in FIG. 5 each concave end can be in the form of a V 23.

The C-shaped portion is also made out of a piece of plate metal or bar stock having any desired width such as 1½" to 2". The C-shaped member 14 is bent or formed with a flat bottom portion 32, an upstanding intermediate or side portion 36 which extends upwardly from one edge of the bottom portion 32 and a curved end portion 38 which extends from the intermediate portion 36. Also, the bottom portion 32 has an opening 40 therein which is adapted to be aligned with the opening 30 in the U-shaped member 12 for receiving therethrough the bolt 16 for securing the two members 12 and 14 together as shown in FIG. 1. From the Figures it will be understood that the concave ends 20 and 22 are received on one side of a rod shaped, tubular frame member 42 forming part of a framework (not shown) which is utilized in a theatre. Such a framework is typically used for supporting curtains, lamps, scenery, etc.

While the concave ends 20 and 22 engage on one side of the tubular member 42, the curved end portion 38 of the C-shaped member 14 engages on the other side of the frame member 42. Actually as best shown in FIG. 1, part of the intermediate portion 36 as well as the curved end portion 38 engage the tubular frame member 42.

When the nut 18 is tightened on the threaded bolt 16 the C-shaped member 14 is drawn toward the U-shaped member 12 and, as a result, the curved end portion 38 is drawn against one side of the tubular frame member 42 while the concave ends 20 and 22 are urged against the other side of the tubular frame member 42 thereby to form a tight gripping engagement of the bracket assembly 10 with the tubular frame member 42.

Also, and what is an important feature of the present invention, the underside of the flat bight portion 24 forms a solid mounting surface against which a mounting bar 44 of a lamp assembly 46 can be secured as shown in FIGS. 1 and 2. In this way, the bracket assembly 10 is particularly adapted for mounting lamp assemblies to a tubular frame member 42 of a theatre framework.

Also it will be readily apparent that by using bar stock or plate metal a very simple and inexpensive bracket assembly 10 can be formed which does not require complex machining operations. In fact, with eithe semi-circular ends or V ends both the U-shaped member 12 and the C-shaped member 14 can be formed in a one or two punching and forming operation. Also, if desired, the openings 40 and/or 30 can be formed with a polygonal shape for engaging a polygonal formation on the underside of the head of the bolt 16 and this way prevent twisting of the C-shaped member 14 relative to the U-shaped member 12.

Figure 3:
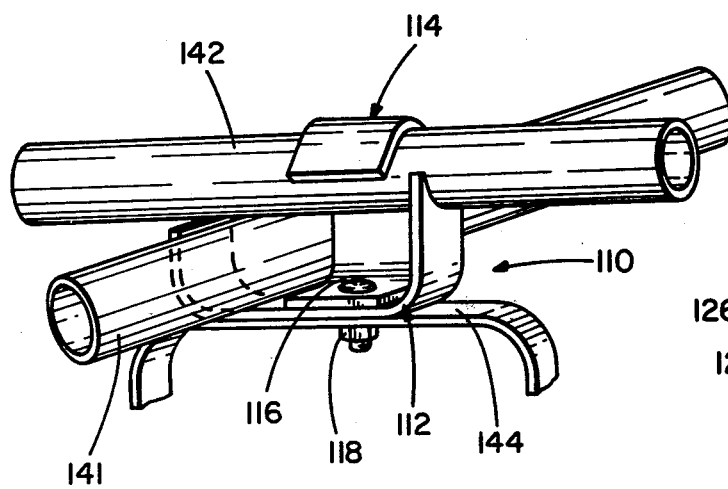
FIG. 3 is a perspective view of another embodiment of the bracket assembly of the present invention which is fastened to the intersection of two crossing tubular frame members.
Figure 4:
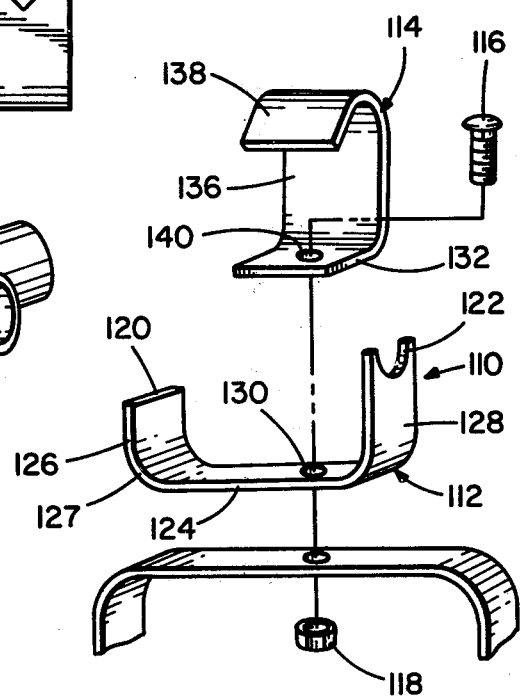
FIG. 4 is an exploded perspective view of the bracket assembly shown in FIG. 3.

Referring now to FIGS. 3 and 4 there is illustrated therein another embodiment of the bracket assembly of the present invention which is identified in FIGS. 3 and 4 by the reference numeral 110.

As shown in FIGS. 3 and 4 the bracket assembly 110 is similar to the bracket assembly 10 and includes a generally U-shaped member 112 and a generally C-shaped member 114 which are held together by a bolt 116 and nut 118. As best shown in FIG. 4 the U-shaped member 112 is first formed from a piece of plate metal or bar stock with a straight cut 120 at one end and a concave end 122 at the other end. As shown the concave end 122 is semi-circular although it could be in the shape of the V 23 shown in FIG. 5. The piece of bar stock or plate metal can be formed in one or more forming or punching operations into the shape shown in FIG. 4 with an elongate bight portion 124, a first leg portion 126 having the flat or straight end 120 and being connected to the bight portion by a curved section 127 and a second leg portion 128 having the concave end 122. Also, an opening 130 is formed in the bight portion 124.

The U-shaped member 112 differs from the U-shaped member 12 in that it has a longer bight portion for the purpose of fastening the bracket assembly 110 to a cross arrangement of two tubular frame members as will be described in greater detail in connection with the further description of FIG. 3. Also, one end, namely, end 120 has a straight end as opposed to the concave end 20 of the U-shaped member 12. Additionally, the opening 130, instead of being located midway between the leg portion 126 and 128 is located approximately midway between the center of the bight portion 124 and the leg portion 128.

The C-shaped member 114 is substantially identical to the member 14 and has a flat bottom portion 132 and intermediate portion 136, a curved end portion 138 and an opening 140 in the bottom portion 132.

As best shown in FIG. 3 a first tubular frame member 141 is received within the U of the U-shaped member 112 and adjacent the curved section 127 formed between the bight portion 124 and the leg portion 126 and against the leg portion 126. A second tubular frame member 142 which forms a cross or T with the first tubular frame member 141 is received on the concave end 122 and on the upper side of the tubular frame member 141 as shown in FIG. 3. The C-shaped member 114 fits in the space between the first tubular frame member 141 and the upstanding leg portion 128 with the curved end portion 138 received over the second tubular frame member 142. With this arrangement the bracket assembly 110 can be utilized to hold two crossing tubular members 141 and 142 together and provide a more rigid framework when the nut 118 is threaded on the bolt 116 as shown in FIG. 3 to draw the curved portion 138 of the C-shaped member 114 against tubular member 142 which then bears against the tubular member 141 and the concave end 122.

Also, as is the case with the bracket assembly 10 the bracket assembly 110 is especially adapted for securing a mounting bar 144 of a lamp assembly (not shown) to the under flat surface of the bight portion 124 of the U-shaped member 112. Again, because of the areal extent of the bottom of the bight portion 124 a good solid mounting of the lamp assembly is obtained. Moreover, in this embodiment, the bracket assembly 110 is multi-functional in that it not only serves to mount a lamp assembly or other device to a tubular framework but also serves to hold a cross of two tubular members together in a rigid manner.

From the foregoing description it will be apparent that the bracket assemblies 10 or 110 of the present invention have a number of advantages some of which have been described above and others of which are inherent in the invention. Accordingly, the scope of the invention is only to be limited as necessitated by the accompanying claims.

I claim:

1. A bracket assembly adapted to be fastened to at least one rod shaped frame member of a framework, said bracket assembly comprising a U-shaped plate member having a flat bight portion with an opening therethrough and first and second leg portions, at least said first leg portion being concave at the outer end thereof, a generally C-shaped plate member having a flat bottom portion, a flat upright intermediate portion extending from one edge of said bottom portion and a curved portion extending from said intermediate portion, said bottom portion having an opening therethrough adapted to be aligned with said opening in said bight portion and means received through said openings for fastening said members together, to the at least one rod member, and, if desired, to a lamp assembly.

2. The bracket assembly according to claim 1 wherein said first and second leg portions each have a concave end.

3. The bracket assembly according to claim 1 wherein said concave end has a generally semi-circular configuration.

4. The bracket assembly according to claim 1 wherein said concave end has a generally V-shaped configuration.

5. The bracket assembly according to claim 1 wherein said opening in said bight portion is located generally midway between said leg portions.

6. The bracket assembly according to claim 1 wherein said bight portion is longer than either of said leg portions, and said opening in said bight portion is located to one side of the center of said bight portion and between said center and said first leg portion.

7. The bracket assembly according to claim 6 wherein said second leg portion is shorter than said first leg portion.

8. The bracket assembly according to claim 2 wherein the rod member is generally cylindrical, the concave ends of said U-shaped member engage on one side of the rod member and said curved portion of said C-shaped member engaging on the other side of the rod member, said fastening means being adapted to draw said C-shaped member toward said U-shaped member thereby to hold the rod member between said concave ends and said curved portion.

9. The bracket assembly according to claim 7 being adapted to be fastened to two rod members arranged in a cross arrangement and wherein one rod member is received within the U of the U-shaped member and between said center thereof and said second leg portion and the other leg portion is received on and engages said concave end of the first rod member and said curved portion of said C-shaped member engages the second rod member and is adapted to be drawn against the same by said fastening means when said fastening means draws said curve portion against the second rod member.

* * * * *